(12) United States Patent
Hirai

(10) Patent No.: US 7,202,895 B2
(45) Date of Patent: Apr. 10, 2007

(54) IMAGE PICKUP APPARATUS PROVIDED WITH IMAGE PICKUP ELEMENT INCLUDING PHOTOELECTRIC CONVERSION PORTIONS IN DEPTH DIRECTION OF SEMICONDUCTOR

(75) Inventor: Yuichi Hirai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 787 days.

(21) Appl. No.: 10/406,457

(22) Filed: Apr. 4, 2003

(65) Prior Publication Data

US 2003/0193590 A1 Oct. 16, 2003

(30) Foreign Application Priority Data

Apr. 10, 2002 (JP) .............................. 2002-108229

(51) Int. Cl.
*H04N 3/14* (2006.01)
(52) U.S. Cl. ...................................... 348/272; 348/294
(58) Field of Classification Search ................ 348/294, 348/272, 223.1, 230.1, 267, 274, 275, 280, 348/281, 302, 308
See application file for complete search history.

(56) References Cited

U.S. PATENT DOCUMENTS 5,965,875 A 10/1999 Merrill ....................... 250/226

| | | | |
|---|---|---|---|
| 6,058,208 A * | 5/2000 | Ikeda et al. .................. 382/167 |
| 6,201,893 B1 * | 3/2001 | Shiraiwa et al. ............. 382/167 |
| 6,731,397 B1 * | 5/2004 | Merrill et al. .............. 358/1.16 |
| 6,791,606 B1 * | 9/2004 | Miyano .................... 348/223.1 |
| 2002/0012463 A1 * | 1/2002 | Yamada ....................... 382/167 |
| 2002/0051071 A1 * | 5/2002 | Itano et al. .................. 348/340 |

FOREIGN PATENT DOCUMENTS

EP 1014683 A2 * 6/2000

* cited by examiner

*Primary Examiner*—David Ometz
*Assistant Examiner*—Tuan Le
(74) *Attorney, Agent, or Firm*—Fitzpatrick, Cella, Harper & Scinto

(57) ABSTRACT

A sensor including an image pickup element provided with arrangement of a plurality of pixels, each including a plurality of photoelectric conversion portions in a depth direction of a semiconductor, outputs each color component from the same pixel position so that the color components are not extracted separately but extracted as a component different from an ordinary color signal, and this causes an image quality deterioration. The sensor of the present invention, however, is arranged to perform color correction of the signals of the plurality of pixels output from the image pickup element by using different color correction coefficients, respectively, thereby obtaining a high quality image, and to perform appropriate color correction corresponding to color temperature by discriminating an appropriate color correction coefficient to be used for the color correction in accordance with the color temperature detected by an external color temperature sensor at the time of photographing.

12 Claims, 8 Drawing Sheets

IMAGE PICKUP APPARATUS PROVIDED WITH IMAGE PICKUP ELEMENT INCLUDING PHOTOELECTRIC CONVERSION PORTIONS IN DEPTH DIRECTION OF SEMICONDUCTOR

BACKGROUND OF THE INVENTION

1. Field of the Invention

The present invention relates to an image pickup apparatus for picking up an object image.

2. Description of Related Art

Conventionally, a digital still camera processes an electric signal photoelectrically converted by image pickup means to record picked up image information into, for example, an external recording medium (such as a memory card, a hard disk or the like) as electric (magnetic) information. In the processing of the electric signal, image processing is performed by treating an image as digital information, and thereby makes it possible to reproduce the image as the electric signal after photographing, which is different from a conventional film-based camera which executes photographing by printing an image on a film.

FIG. 5 shows a block diagram of principal parts of a conventional digital still camera. In the attached drawings, it is supposed that components (blocks and the like) designated by the same reference numerals in a certain figure as those in other figures have the same functions as those in the other figures.

FIG. 5 does not show components such as a user interface and the like other than ones related to digital processing of photographed image information. Also, FIG. 5 does not show the control of the camera mechanism elements which do not relate to the scope of the present invention. As an interface (I/F) with a camera control unit, a camera controller I/F 118 is shown in FIG. 5. Moreover, in FIG. 5, a reference numeral 117 denotes a coprocessor for performing calculations of automatic focusing (AF) and automatic exposure (AE). The coprocessor 117 is provided to lighten the load of a central processing unit (CPU) 116. The camera controller I/F 118 and the coprocessor 117 are shown for indicating the existence of the camera mechanism elements linking with the principal parts in the block diagram.

The conventional digital still camera converts optical information into a charge quantity by means of image pickup means such as a charge coupled device (CCD), a complementary metal-oxide semiconductor (CMOS) sensor and the like, and stores the converted electric charges in a capacitative element. Thereby, the conventional digital still camera picks up image information as an electric signal. In FIG. 5, a reference numeral 101 denotes an imager apparatus corresponding to the CCD, the CMOS sensor and the like. The imager apparatus 101 is provided with arrangement of sensors constituting pixels respectively. The information of each pixel is transferred to a processing unit 102 at the next stage in synchronization with a timing signal generated by a timing generator 103.

The processing unit 102 is an analog signal processing unit including correlated double sampling (CDS), automatic gain control (AGC), an analog-digital converter (ADC) and the like to digitize the image information. In the stages after the ADC, the information at every pixel is treated as digital data. The digital data are transferred to the next stage in synchronization with, for example, a clock generated by the timing generator 103.

In FIG. 5, a reference numeral 104 denotes a pixel information correction unit. The pixel information correction unit 104 corrects defects and characteristics included in a signal from the sensor before performing the image processing of image information (a picture). That is, the pixel information correction unit 104 performs, for example, the removal of dark current components, the correction of shading, the correction of dot scratches, and the like. A digital signal from the sensor, subjected to the correction processing, is then subjected to the image processing of an image processing unit 107 in FIG. 5 as an image signal.

In most cases, the image processing unit 107 is provided as hardware in consideration of a processing speed. If the image processing unit 107 is supposed to be hardware, there is a case where an appropriate buffer is necessary from the points of views of filtering and holding of reference information. The configuration of FIG. 5 is provided with an image buffer 106 for storing temporarily the signals from the sensors when the throughputs of the stages after the image processing unit 107 are lowered, and a traffic controller 105 for controlling the transfer timing of the signals from the sensors.

The image buffer 106 is effective, for example, in case that the image information captured at continuous photographing is stored continuously. In a configuration in which the capturing of images and the sequence of image processing are separated from each other, there is a case where the traffic controller 105 and the image buffer 106 are positioned before the pixel information correction unit 104 shown in FIG. 5.

If the image pickup means is a sensor using a red (R), green (G) and blue (B) Bayer arrangement filter, the image processing unit 107 performs image processing as follows. That is, the image processing unit 107 generates each signal of R, G and B at each pixel position by an interpolation method, sets white balance, performs a matrix operation and gamma processing, both being one of color corrections corresponding to an output medium severally, and suppresses false colors generated at the stages up to the gamma processing. At the setting of the white balance, for example, the sensor is divided into several areas, and the integrated values of Bayer information of respective areas are compared with one another to estimate a white color position on the basis of the ratio of the integrated values. A reference numeral 108 in FIG. 5 denotes an integrator for integrating signal values in each of the areas. A reference numeral 109 in FIG. 5 denotes a coefficient value calculation algorithm for determining a white balance operation coefficient on the basis of the integrated values of the integrator 108. The coefficients are determined by calculation or by selection of a value among ones in a table.

The matrix operation, one of the color corrections, is to perform matrix operations of the R, G and B signals to change a map in a color space dependently on the signal values of respective colors. A white balance coefficient and a matrix coefficient, each being one of the color correction coefficients, affect the characteristics as the whole image. The conventional digital still camera therefore does not change the white balance coefficient and the matrix coefficient at every pixel dynamically.

The example of the digital still camera of FIG. 5 is configured to compress and record image information subjected to the image processing. In FIG. 5, a reference numeral 112 denotes a compression/decompression unit. The transfer sequence of data up to the compression/decompression unit 112 is a raster scan over the whole screen. However, there is a case where the compression/decompression unit 112 requires an input data sequence other than the raster scan. In the conventional digital still camera, a representative example of such a data sequence is the Joint Photographic Experts Group (JPEG) compression.

In the JPEG compression, data is input on the block basis called as a microcomputer unit (MCU). For realizing this data input, the data processing sequence should be changed in accordance with a raster-block conversion. In FIG. 5, a reference numeral 110 denotes a scan conversion control unit for realizing the raster-block conversion by storing data into a temporary buffer 111 temporarily in the order of the raster and by outputting the stored data to the compression/decompression unit 112 at the next stage when the data quantity stored in the temporary buffer 111 becomes sufficient to be read on the block basis.

Moreover, the compressed data stored in a recording medium 122 is decompressed by the compression/decompression unit 112 to be stored in the temporary buffer 111 temporarily. After that, the data is read from the temporary buffer 111 to be subjected to the reduction procession of a resampling unit 113 for generating a thumbnail. Then, the reduced data is stored in a work memory 114. Thus, it is possible to display the data on a liquid crystal display (LCD) monitor 124 through the CPU 116 and a monitor driver 123.

The CPU 116 in FIG. 5 performs the condition setting (not shown) of each block on the basis of control information stored in a program memory 115. The CPU 116 also performs the transfer of display data to the monitor driver 123, the control of data transfer to an I/F controller 119, and the control of data transfer to a card memory controller 121. The I/F controller 119 drives an I/F driver 120 for driving buses physically. Moreover, the card memory controller 121 executes data writing into the recording medium 122.

Recently, image pickup means has been realized in accordance with a system other than the one adopted by the conventional image pickup means mentioned above. That is, for example, it is a multi-layer photodiode type image sensor or the like.

A conventional multi-layer photodiode type image sensor is disclosed in U.S. Pat. No. 5,965,875 in detail. U.S. Pat. No. 5,965,875 discloses the principle of an image sensor of a three-layer photodiode structure, in which photodiodes are formed in a triple well structure, and pixel circuits. FIG. 6 shows a schematic diagram of a three-color pixel sensor using the three-layer structure.

According to the U.S. Pat. No. 5,965,875, the photodiodes are diffused into the surface of a p-type silicon substrate in order. An n-type layer, a p-type layer and an n-type layer are formed to be deeper in the order. Thereby, three layers of pn junction diodes are formed in the depth direction of the silicon substrate. The longer the wavelength of the light entered into the diodes from the surface side is, the deeper the light penetrates the layers.

In FIG. 6, a reference numeral 501 denotes the silicon substrate forming a p-type layer. The area denoted with a reference numeral 502 in FIG. 6 is a deeper n-type layer well area formed on the substrate 501. The depth of the deepest position of the n-type layer is within about a range from 1.5 µm to 3.0 µm from the surface. In FIG. 6, the depth of the deepest position of the n-type layer is set about 2 µm. The wavelength of red color is absorbed at the junction position to be measured as electron quantities (indicated by a reference numeral 510 in FIG. 6) of the substrate 501 and the well 502.

Since an incident wavelength and an attenuation coefficient to the wavelength are specific to silicon, it is possible to detect optical signals in different wavebands by detecting currents separately from the three-layer diodes mentioned above. The depths of the pn junctions of the three-layer photodiodes are set to cover the waveband of visible rays.

Similarly, a reference numeral 504 in FIG. 6 denotes a p-type well formed on the n-type well 502. The depth of the deepest position of the p-type well 504 from the surface is 0.6 µm in FIG. 6. The wavelength of a green color is absorbed at the junction between the p-type well 504 and the n-type well 502. The absorbed wavelength of the green color is measured as indicated by a reference numeral 512 in FIG. 6. A reference numeral 506 in FIG. 6 denotes a shallow layer n-type well area, the deepest position of which is 0.2 µm from the surface in FIG. 6. The wavelength of a blue color is absorbed at the junction between the n-type well area 506 and the p-type well 504. The absorbed wavelength of the blue color is measured as indicated by a reference numeral 514 in FIG. 6. By performing the operation processing of the three color signals, it is possible to separate the three color signals, and to reproduce an image.

Since it is possible to pick up the three color signals of R, G and B at the same pixel position in the three-layer photodiode type image sensor described above, there is no necessity of performing any color interpolation operation such as the aforesaid interpolation, and no false color owing to the interpolation operation is generated. Such advantages of the three-layer photodiode type image sensor attract attention. Although the three-layer photodiode type image sensor can detect light in different wavebands by means of the differences of depths of the three-layer photodiodes, obtained three signals overlap each other in a relatively large degree.

FIG. 7 shows a distribution of wavelengths of the light which the sensor absorbs. According to the distribution, for example, even if the peak sensitivity of the middle layer photodiode is set near to a G color (545 nm), this photodiode also photoelectrically converts an optical signal near to an R color (630 nm) and an optical signal near to a B color (450 nm) at the rate of several tens % or more. If a signal including various colors at a large rate is processed, the color reproducibility of the signal becomes deteriorated. The signal has also a defect of being easily affected by noises.

Moreover, the gain of each photodiode, i.e. a variation of a voltage of the diode to be generated by a unit charge quantity, is in inverse proportion to the pn junction capacitance C of the photodiode. Since the areas of the three diodes are inevitably different from one another and the pn junction capacitance per unit area is determined by the density of each diffusion layer, it is difficult to make the capacitance of the three photodiodes agree with one another. Consequently, three optical signals read from the three photodiodes have gains different from one another. Hence it is difficult to deal with the signals in signal operation. Moreover, the signal processing of the signals are further complicated owing to the color mixture among the signals in a large degree as described above.

Among the layers of the three photodiodes, two photodiodes adjacent to each other in the vertical direction are coupled in their capacity to each other through a pn junction. As the charges generated by photoelectric conversion are accumulated in a photodiode, the capacitance of the photodiode changes. Consequently, the electric potential of a photodiode at certain layers is influenced also by the charge quantity stored in another photodiode at other layers. Hence, there is a problem in which the linearity of the photodiode deteriorates or the linearity changes according to colors.

In addition, when the photodiode at the uppermost layer is saturated, electrons excessive in the photodiode get over the potential barrier composed of the p-type layer at the second layer from the top to flow into the n-type area of the photodiode at the lowermost layer. Consequently, if an image having an intense optical component of a short wavelength is picked up, a signal which should not exist originally is detected on the long wavelength side of the pixel, thereby deteriorating the color reproducibility of the pixel.

As described above, the multi-layer photodiode type image sensor is a sensor capable of detecting the wavelength component of each color of R, G and B at the same pixie position. However, each color component is not necessarily extracted separately from one another at the time of outputting. Moreover, there is the possibility of being extracted as a component different from the original color signal.

That is, a color mixture state among the R, G and B signals to be picked up, the influence of the variations of charge quantities owing to the influence of capacity coupling, and the influence of the outflows and the inflows which get over potential barriers differ from a point to a point in a screen according to an object to be photographed and the states of ambient light. Consequently, it is difficult to reproduce a high quality image from the outputs of a sensor having the three-layer photodiode type structure by the conventional image processing performed using coefficients determined on the frame basis.

However, as described above in connection with the block diagram in FIG. 5 exemplifying the principal parts of the configuration of a conventional apparatus, the setting of coefficients of the image processing unit 107 has conventionally been fixed in an image in a digital image processing apparatus for processing and recording as a digital signal optical information generated by image pickup means (such as a CCD, a CMOS sensor and the like).

SUMMARY OF THE INVENTION

An objective of the present invention is to enhance the image quality of an image picked up at an image pickup area provided with a plurality of pixels including a plurality of photoelectric conversion portions in the depth direction of a semiconductor severally.

An aspect of the present invention provides an image pickup apparatus comprising:

an image pickup area provided with arrangement of a plurality of pixels each including a plurality of photoelectric conversion portions in a depth direction of a semiconductor; and a signal processing device for dividing the image pickup area into a plurality of partial areas and performing color correction on signals from at least two areas among the plurality of partial areas by using different color correction coefficients.

According to the present invention having the configuration described above, it is possible to obtain an image having a high image quality from the image pickup area provided with the arrangement of the plurality of pixels each including the plurality of photoelectric conversion portions in the depth direction of the semiconductor.

An another aspect of the present invention provides an image pickup apparatus comprising:

an image pickup area provided with arrangement of a plurality of pixels each including a plurality of photoelectric conversion portions in a depth direction of a semiconductor;

a color temperature sensor for detecting a color temperature; and a signal processing device for dividing the image pickup area into a plurality of partial areas and performing color correction, wherein the signal processing device has a mode for discriminating the color correction coefficients to be used for the color corrections on a basis of the signals from the image pickup area and a signal from the color temperature sensor, and a mode for performing the color correction on signals from at least two areas among the plurality of partial areas by using different color correction coefficients.

Since the linearities of the output signals from the image pickup area provided with the arrangement of the plurality of pixels each including the plurality of photodiodes in the depth direction of the semiconductor cannot be kept, and color deviations are generated in resulted images in case that only the coefficients set in a white balance calculation circuit are used, the present embodiment discriminates appropriate color correction coefficients on the basis of the output signal from the image pickup area and the signal obtained from the color temperature sensor, and can perform appropriate color corrections. Consequently, images having high image qualities can be obtained.

Still another aspect of the present invention provides an image pickup apparatus comprising:

an image pickup area provided with arrangement of a plurality of pixels each including a plurality of photoelectric conversion portions in a depth direction of a semiconductor;

a color temperature sensor for detecting a color temperature; and a signal processing device for dividing the image pickup area into a plurality of partial areas to perform color correction on signals from at least two areas among the plurality of partial areas by using different color correction coefficients, wherein the signal processing device calculates the plurality of color correction coefficients to be used for the color correction on a basis of the signal output from the image pickup area and a signal from the color temperature sensor, and performs the color correction on the signal from the image pickup area by using the plurality of calculated color correction coefficients.

Since the linearities of the output signals from the image pickup area provided with the arrangement of the plurality of pixels each including the plurality of photodiodes in the depth direction of the semiconductor cannot be kept, and color deviations are generated in resulted images in case that only the coefficients set in a white balance calculation circuit are used, the present embodiment calculates appropriate color correction coefficients on the basis of the output signal from the image pickup area and the signal obtained from the color temperature sensor, and can perform appropriate color corrections. Consequently, images having high image qualities can be obtained.

Still another aspect of the present invention provides a signal processing method of an image pickup apparatus including an image pickup area provided with arrangement of a plurality of pixels each including a plurality of photoelectric conversion portions in a depth direction of a semiconductor, the method comprising the steps of:

dividing pixel signals of a picture output from the image pickup area into a plurality of areas; and performing color corrections of the divided areas by using different color correction coefficients respectively.

Still another aspect of the present invention provides a signal processing method of an image pickup apparatus including an image pickup area provided with arrangement of a plurality of pixels each including a plurality of photoelectric conversion portions in a depth direction of a semiconductor, and a color temperature sensor for detecting a color temperature, the method comprising:

discriminating color correction coefficient to be used for color correction on a basis of signal from the image pickup area and a signal from the color temperature sensor; and performing the color correction of the signal from the image pickup area by using the color correction coefficients different from each other.

Still another aspect of the present invention provides a signal processing method of an image pickup apparatus including an image pickup area provided with arrangement of a plurality of pixels each including a plurality of photoelectric conversion portions in a depth direction of a semiconductor, and a color temperature sensor for detecting a color temperature, the method comprising:

calculating a plurality of color correction coefficients to be used for color correction on a basis of a signal output from the image pickup area and a signal from the color temperature sensor; and performing the color correction of the signal from the image pickup area by using the plurality of color correction coefficients.

The other objects and features of the present invention will be apparent from the following specification and the attached drawings.

DESCRIPTION OF THE PREFERRED EMBODIMENTS

Embodiment 1

An image pickup apparatus of a first embodiment will be described by reference to FIGS. 1 and 2.

Figure 1:
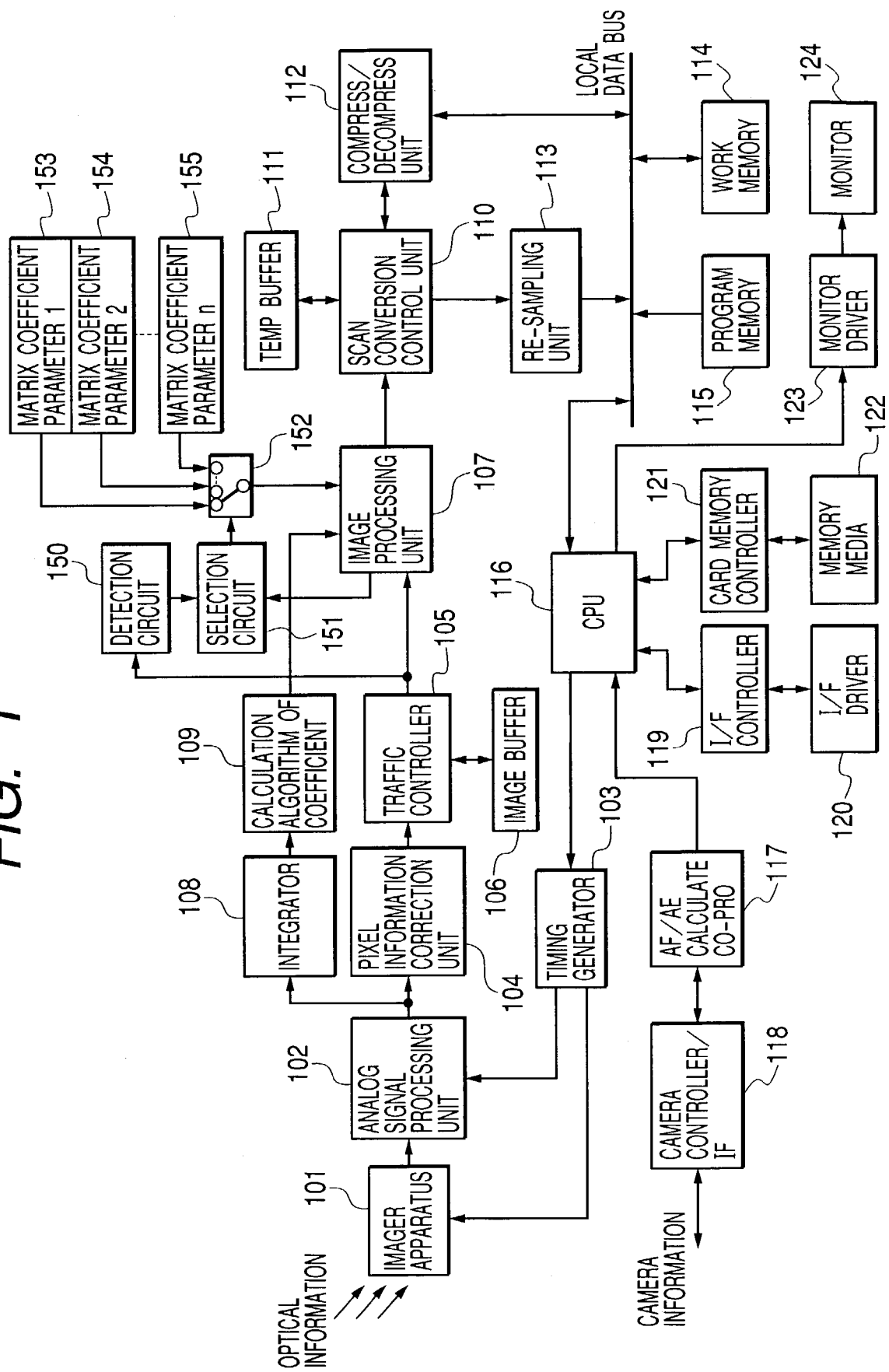
FIG. 1 is a block diagram showing an image pickup apparatus of a first embodiment.
Figure 5:
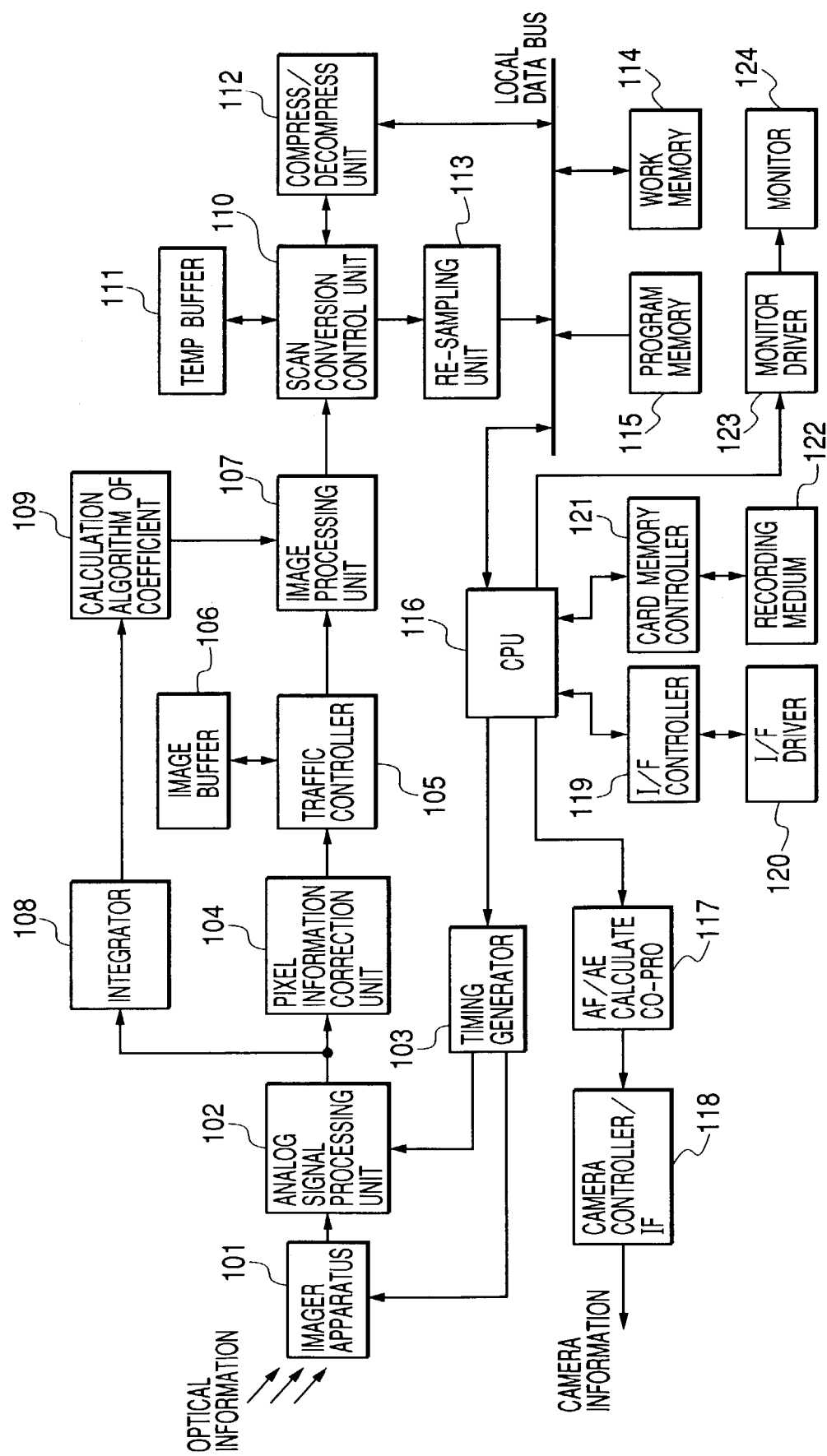
FIG. 5 is a block diagram showing a conventional image pickup apparatus.
Figure 6:
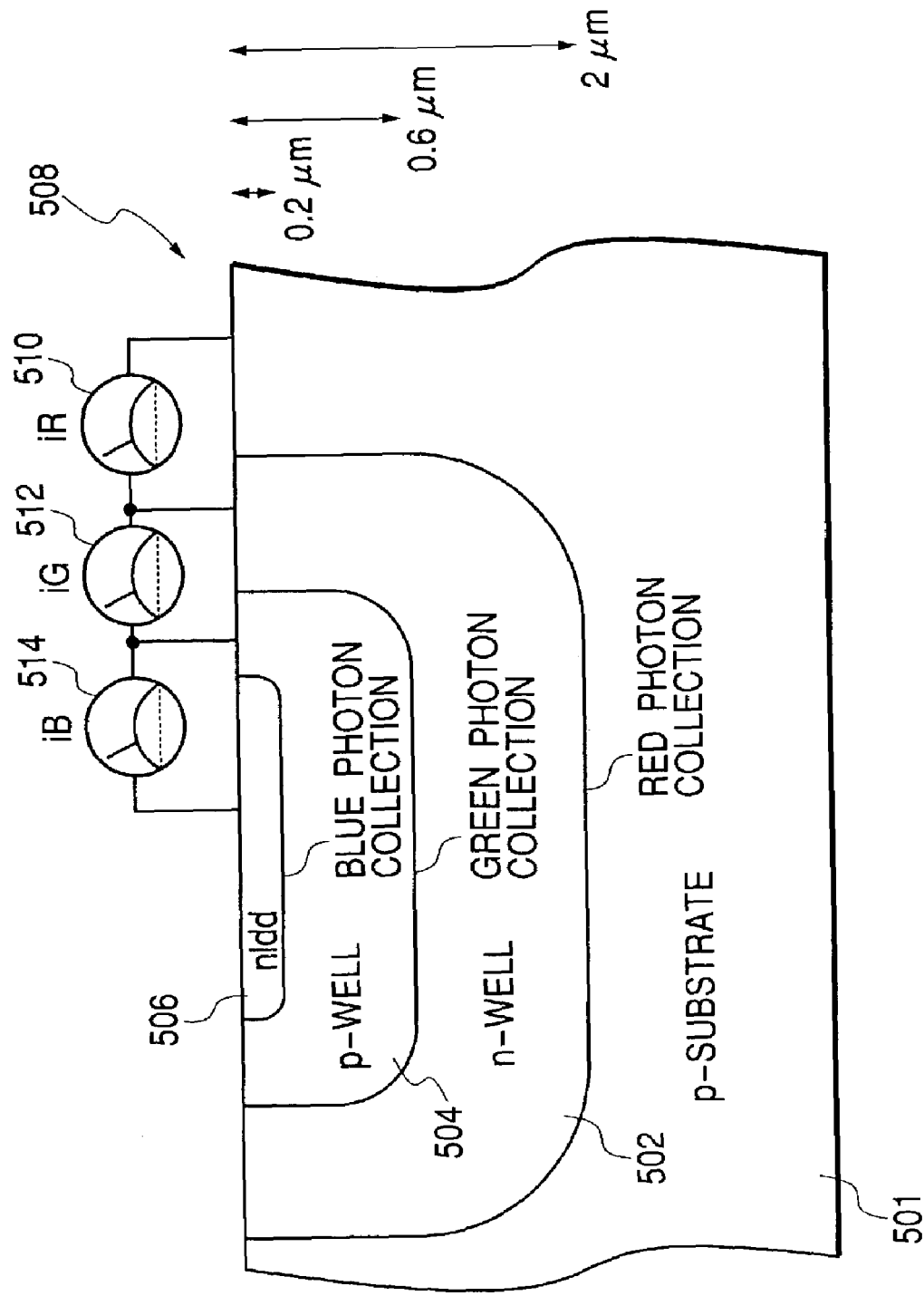
FIG. 6 is a view showing an image pickup element having a three-layer structure.
Figure 7:
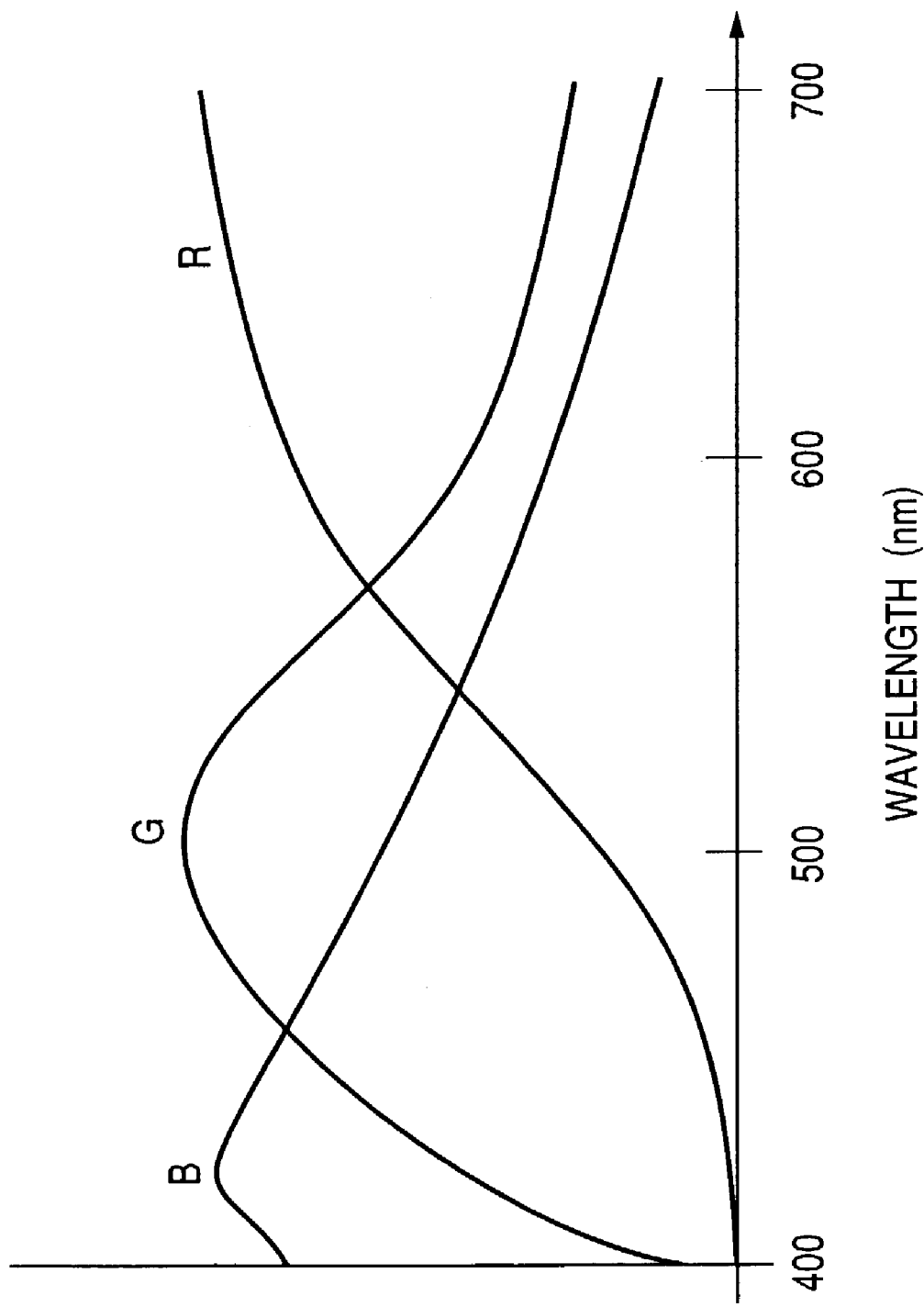
FIG. 7 is a graph showing distributions of wavelengths of light.

The configuration of the image pickup apparatus of FIG. 1 is different from that of the conventional apparatus of FIG. 5 and includes a detection circuit 150 for detecting the state of a signal component of a subjected pixel, a selection circuit 151 for selecting a correction coefficient of color correction processing on the basis of a detection result of the detection circuit 150, several matrix coefficient parameters (represented by reference numerals 153–155) to be selected by the selection circuit 151, a switch 152 for switching the parameters 153–155 in accordance with the selection circuit 151 to output the switched parameter, and the image processing unit 107. The image pickup apparatus of FIG. 1 therefore switches the processing coefficients of the color correction processing at every pixel, and thus can deal with correction factors changing every moment in the state of the R, G and B signals while the conventional processing coefficients are switched at every frame or at every photographing chance.

The image processing unit 107 performs as a color correction depending on the signal values of the R, G and B signals, for example, a matrix operation for mapping R, G and B signals onto signals (coordinates) in the same color space and other operations.

Moreover, in the present embodiment, the imager apparatus 101 has the three-layer photodiode structure, i.e. the structure having an image pickup area provided with arrangement of a plurality of pixels including a plurality of photodiodes being photoelectric conversion portions in the depth of a semiconductor.

As described above, the present embodiment includes signal processing means for performing color correction to signals from a plurality of pixels in the image pickup area by the use of different color correction coefficients. The signal processing means includes the detection circuit 150, the selection circuit 151, the parameters 153–155, the switch 152 and the image processing unit 107. Consequently, it becomes possible to perform a suitable color correction.

Figure 2A:
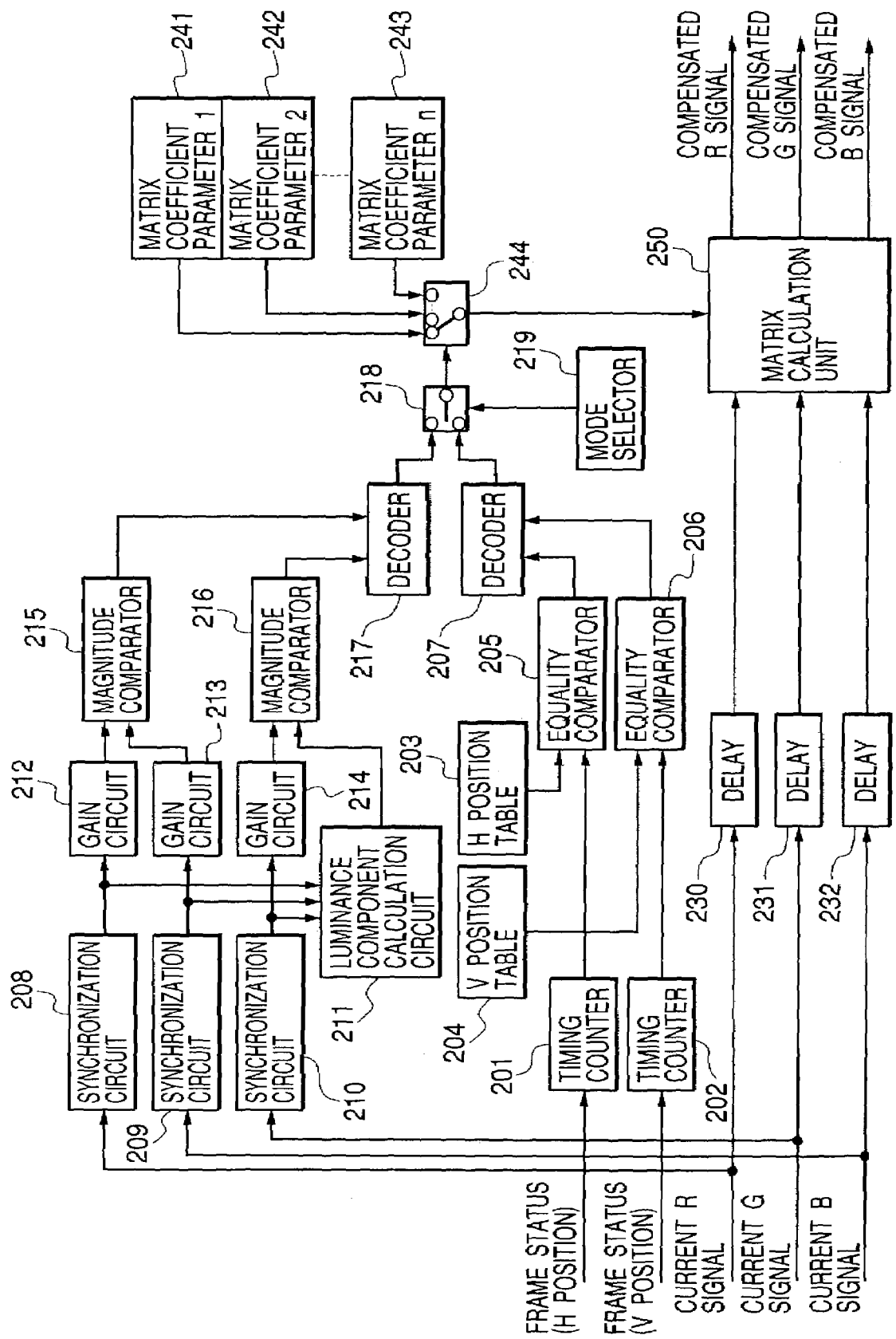
FIGS. 2A and 2B are block diagrams showing a signal processing device of the image pickup apparatus of the first embodiment.
Figure 2B:
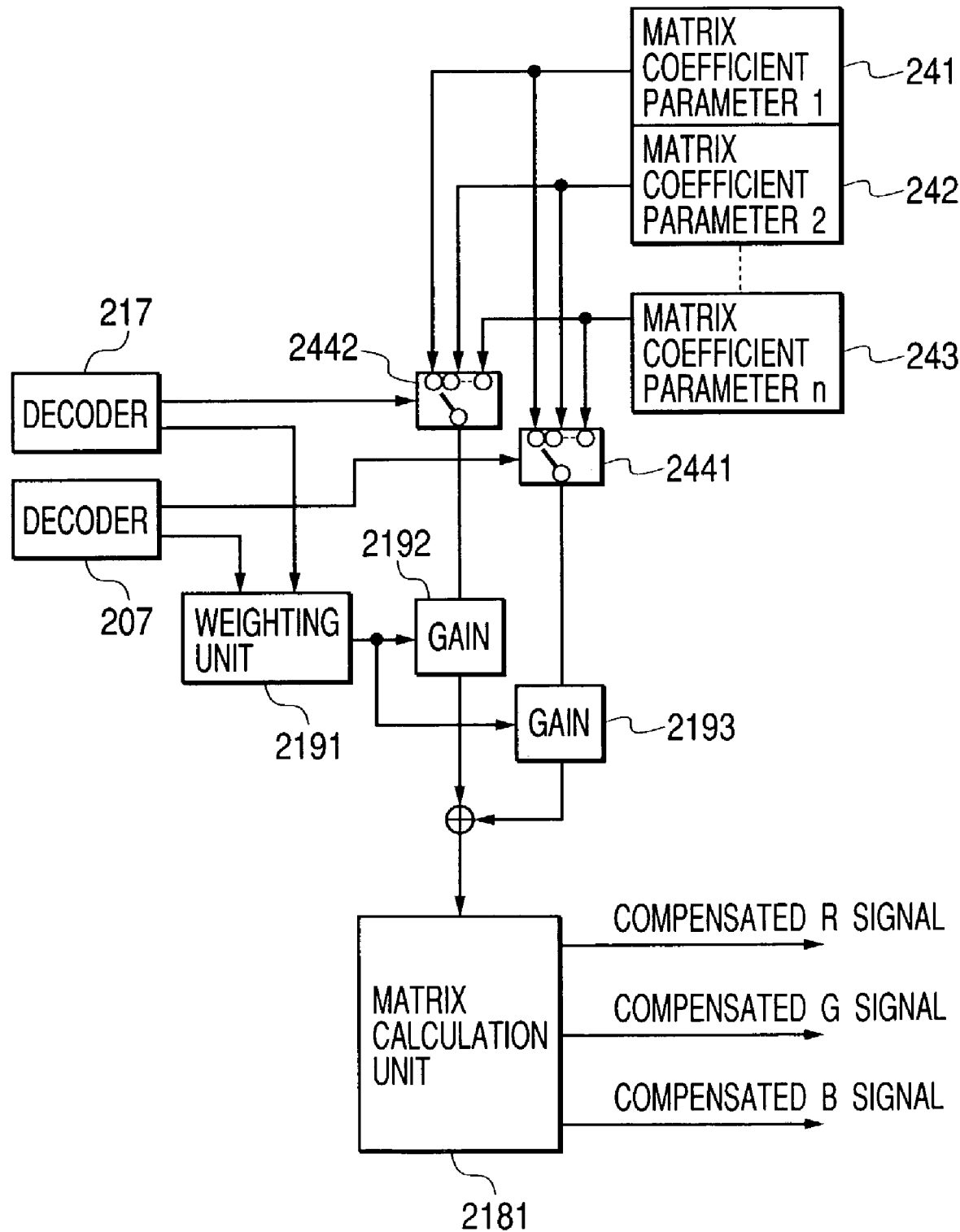

FIGS. 2A and 2B are block diagrams showing the above-mentioned signal processing means in the form of being functionally divided in detail.

The signal processing means includes a configuration for changing the color correction coefficients of the frames to be processed, in consideration of the positional information of sensor output signals, and a configuration for changing correction coefficients according to signal components of each pixel.

First, descriptions will be given to the construction for changing the color correction coefficients of the frames to be processed, in consideration of the positional information of the sensor output signals.

Current processing positional information is provided to trace and cognize horizontal (H) positional information (status) and the vertical (V) positional information (status) with timing counters 201 and 202 shown in FIG. 2A. Supposing that the characteristics (hysteresis) of the single sensor is determined by the manufacturing processes thereof, the characteristics can be held in advance in an H position characteristic table 203 and a V position characteristic table 204 (in FIG. 2A) of the imager apparatus 101.

The characteristics of the single sensor mentioned hereupon are, for example, the characteristics depending on pixel positions. The characteristics are influenced by the aforesaid problems such as the color mixture state of each of the R, G and B signals to be picked up, the influence of the variations of charge quantities owing to the influence of capacity coupling, and the influence of the outflows and the inflows which get over potential barriers, and the like. These problems depend on an object to be photographed and the states of ambient light. The change of the characteristics, e.g. positional information related to a position greatly different from other peripheral pixels, are stored in the characteristic tables 203 and 204 which are storage means.

Equality comparators 205 and 206 specify a designated position while comparing the positional information held in the characteristic tables 203 and 204 as a hysteresis, with the instructions from the timing counters 201 and 202. When the equality comparators 205 and 206 detect a switching point of the color correction coefficients for correcting the characteristics of the simple sensor, the equality comparators 205 and 206 transmit to a decoder 207 in FIG. 2A selection instruction information instructing a selection to be switched. The decoder 207 is means for reflecting the information of an input signal to a switch 244 in FIG. 2A. Pairs of parameters to be switched are determined in advance by performing examination of image processing. In the configuration in FIG. 2A, the examination of characteristics themselves are not performed.

Then, matrix coefficient parameters 241–243 are selected through a switch 218 and the switch 244.

Input R, G and B data is made synchronous with an output of the switch 244 after they pass through delay lines 230–232 of respective signals. Correction operation is performed by a matrix calculation unit 250 in FIG. 2A by using selected matrix coefficient parameters.

In the present embodiment, color correction of R, G and B is performed by linear calculation (matrix operations) of linear combinations of data and parameter. It is needless to say that high order functional operations may be performed in place of the matrix operations using a table, in the case where a high precision is required. In this case, the functional operations are not necessarily matrix operations. It is also needless to say that the coefficient parameters themselves may be calculated without using a table.

As described above, the signal processing device described with reference to FIG. 1, specifically, includes the matrix coefficient parameters 241–243 which are a plurality of color correction coefficients, the matrix calculation unit 250 for performing the color correction of a signal from the image pickup area by the use of the plurality of color correction coefficients, the characteristic tables 203 and 204 storing the information pertaining to the plurality of pixels in the image pickup area, the timing counters 201 and 202, the equality comparators 205 and 206, the decoder 207 and the switch 244. The timing counters 201 and 202, the equality comparators 205 and 206, the decoder 207 and the switch 244 are provided to discriminate the color correction coefficients to be used for color corrections in the matrix calculation unit 250, on the basis of the information of the characteristic tables 203 and 204. According to the configuration described above, the signal processing device of the present invention therefore switches the processing coefficients of color correction processing at every pixel and thus can perform appropriate color corrections corresponding to correction factors changing every moment according to the states of the R, G and B signals, while the conventional processing coefficients switch at every frame or every photographing chance.

Next, a case where the correction coefficients are changed according to a signal component at each pixel will be described. The present embodiment is an example of the comparison of each signal component. It is possible to propose several kinds of methods of the comparison of each signal component in accordance with the characteristics of the sensor.

Now, each of the input signals of R, G and B is made to be synchronized by synchronization circuits 208, 209 and 210 in FIG. 2A. Each signal component subjected to only a pixel correction is still a signal which holds the characteristics (hysteresis) of the sensor.

In the present embodiment, a luminance component calculation circuit 211 in FIG. 2A calculates a luminance component. The synchronization mentioned above is used, for example, to provide a same output timing to a subsequent stage in the case where each of the R, G and B signal components is not simultaneously input or the like.

The magnitude of the luminance component calculated by the luminance component calculation circuit 211 is compared at a magnitude comparator 216 in FIG. 2A with the magnitude of the G signal component multiplied by a gain by a gain circuit 214 in FIG. 2A. The influence of the color mixture to the G signal component of the signal components other than the G signal component is grasped by means of the simplified luminance obtained from the G signal component and the luminance obtained from the R, G and B signals. Moreover, the R signal is multiplied by a gain by a gain circuit 212, and the B signal is multiplied by a gain by a gain circuit 213. The magnitudes of the R signal and the B signal multiplied by the gains severally are compared with each other by a magnitude comparator 215. Each of the gains is provided to adjust matching with the luminous components to be used at a subsequent stage.

A decoder 217 in FIG. 2A obtains the influences of the R and B signals to the G signal and the magnitude differences between the R signal and the B signal from the outputs of each of the magnitude comparators 215 and 216. Then, the decoder 217 outputs switching instructions of the color correction coefficient values (matrix coefficient parameters) 241–243 at every pixel in order to set the gain values so that the degree of the color mixture owing to the sensor characteristics and the influences of the capacitance components different in each color are cancelled.

As described above, the signal processing device described by reference to FIG. 1 includes the matrix coefficient parameters 241–243 which are a plurality of color correction coefficients, the matrix calculation unit 250 for performing the color correction of the signal from the image pickup area by the use of the plurality of color correction coefficients, the synchronization circuits 208–210, the luminance component calculation circuit 211, the gain circuits 212–214, the magnitude comparators 215 and 216, the decoder 207 and the switch 244. The synchronization circuits 208–210, the luminance component calculation circuit 211, the gain circuits 212–214, the magnitude comparators 215 and 216, the decoder 207 and the switch 244 are provided to discriminate the color correction coefficients to be used for the color correction in the color correction means, on the basis of the signal from image pickup area. According to the configuration described above, the signal processing device of the present invention can perform appropriate color correction at every pixel.

The switch 218 is a switch for switching the outputs of the decoders 207 and 217 in FIG. 2A to be transmitted to the switch 244.

It is possible to select one of the configurations described above with a mode selector 219 in advance. Moreover, instead of selecting the configuration in an alternative way, it is possible to change coefficients by adding respective weights as shown in FIG. 2B. The configuration of FIG. 2B is arranged to determine the respective weights of the decoders 207 and 217 by a weighting unit 2191 in FIG. 2B and to perform proportional addition with a matrix calculation unit 2181 in FIG. 2B.

Moreover, an image pickup apparatus provided with either of the configurations may be adopted.

Moreover, the detection circuit 150 in FIG. 1 corresponds to the synchronization circuits 208–210, the luminance component calculation circuit 211, the gain circuits 212–214, the magnitude comparators 215 and 216, the characteristic tables 203 and 204, the timing counters 201 and 202, and the equality comparators 205 and 206 in FIG. 2A. The selection circuit 161 in FIG. 1 corresponds to the decoders 207 and 217, the switch 218 and the mode selector 219 in FIGS. 2A and 2B. The image processing circuit 107 in FIG. 1 corresponds to the matrix calculation unit 250 in FIG. 2A.

Embodiment 2

In the first embodiment described above, descriptions are given to the example in which color correction coefficients are set at every pixel. In the present embodiment, descriptions will be given to a case where a frame is divided into arbitrary areas (partial areas including a plurality of pixels severally) and color correction coefficients are adjusted to each of the areas.

Figure 3:
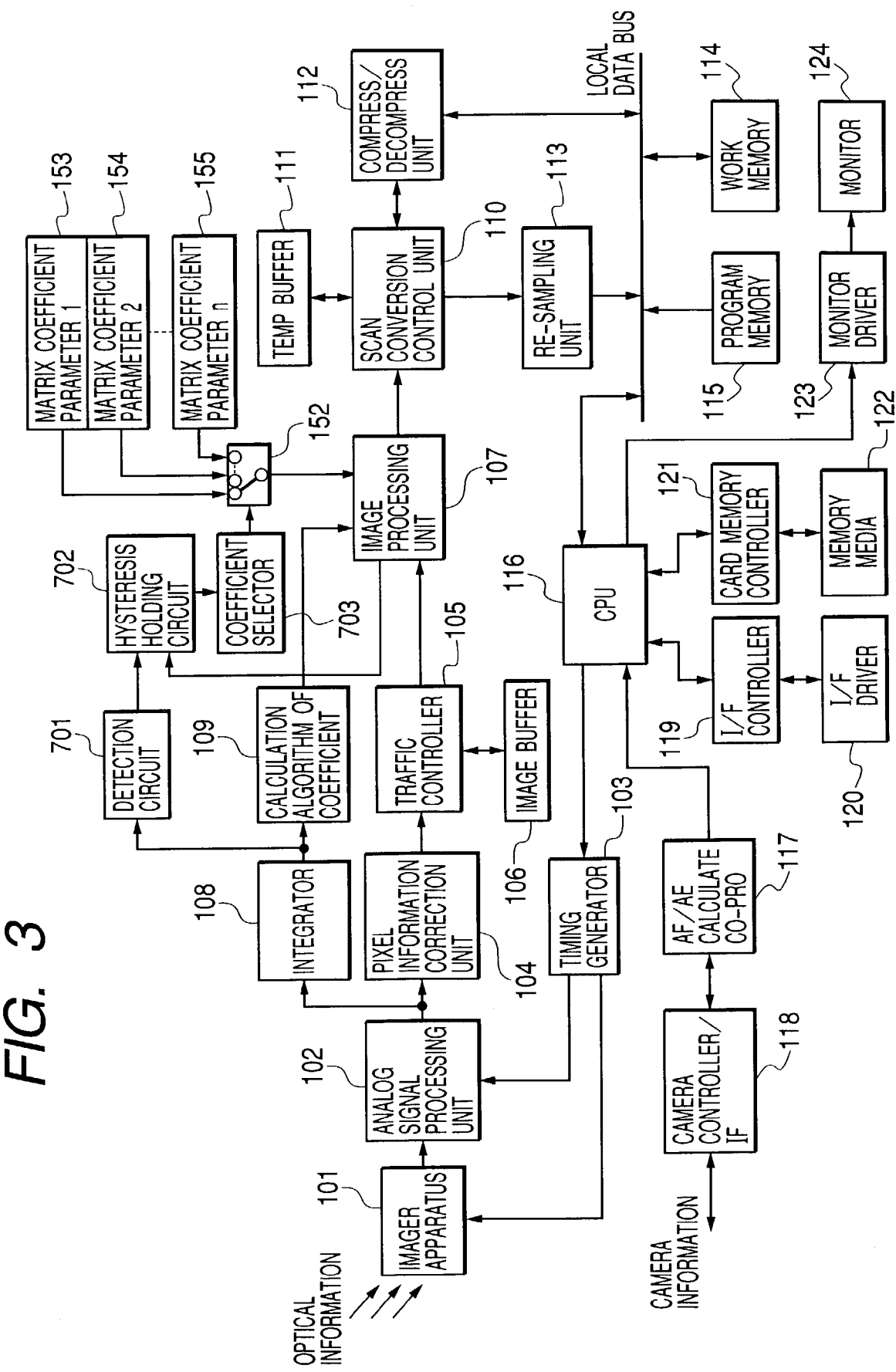
FIG. 3 is a block diagram showing an image pickup apparatus of a second embodiment.

FIG. 3 is a block diagram showing the principal parts of the configuration of the apparatus of the second embodiment. In FIG. 3, the configuration includes a detection circuit 701 for detecting the state of signal components in an arbitrary area, a hysteresis holding circuit 702 for holding the hysteresis of each area of a frame currently subjected to processing, a coefficient selector 703 for selecting a coefficient on the basis of the output from the hysteresis holding circuit 702, the switch 162 and the image processing unit 107. Thereby, it becomes possible to select the correction coefficients of the color correction processing on the basis of an area of a subjected frame.

In FIG. 3, the subjected frame is divided into areas. Then, the detection circuit 701 detects for every area (integrates) the degree of color mixture and the influence of capacity components, which are obtained at every pixel in the first embodiment. The detected information is held in the hysteresis holding circuit 702 until the image processing circuit 107 executes actual processing. The operations of the read out of the held hysteresis and the switching of the matrix coefficient parameters 153–155 can be described by applying the description pertaining to the first embodiment of FIGS. 2A and 2B to the area switching operation.

Moreover, it is also possible to change the setting of the color correction coefficients for every arbitrary area by thinning out the H and V points to be registered with accepting changes of the characteristics of the sensor to a certain degree.

Moreover, it is also possible to set the gain values of the gain circuits 212–214 so as to lower the sensitivity of the gain circuits 212–214 in order that the switching instructions of the color correction values may have hysteresis to a certain degree instead of changing the instructions of the color correction values dynamically for every pixel.

As described above, the present embodiment performs color correction by the use of the different color correction coefficients on signals from a plurality of pixels in the image pickup area, and divides the image pickup area into a plurality of partial areas each including a plurality of pixels to perform the color correction to the plurality of pixels included in the same partial area by the use of the same color correction coefficients. In order to perform the color corrections described above, the present embodiment includes the signal processing means composed of the detection circuit 701, the hysteresis holding circuit 702, the coefficient selector 703, the switch 162, the color coefficient parameters 153–155 and the image processing unit 107. Consequently, the present embodiment appears to obtain averaging (smoothing) of the changes of the switching processing at every pixel. Though the result may lessen the effect of the switching at every pixel, the present embodiment is effective in the case where the influence of the switching of the color correction coefficients appears in an image remarkably. Moreover, the partial areas formed by dividing the image pickup area may be formed by dividing the image pickup area on the basis of, for example, the magnitude of color mixture level which is a characteristic of a single sensor and measured at the time of manufacturing the sensor in advance. In this case, the positional information of the partial areas divided on the basis of the color mixture level may be stored in a storage device such as the hysteresis holding circuit 702 in advance.

Embodiment 3

Descriptions pertaining to the present embodiment will be given to the case of changing the setting of the color correction coefficients in the case where the color correction coefficients should be changed in view of the input levels of respective colors signals of R, G and B.

For example, for calculating the coefficient of white balance, there is the case of using an external color temperature sensor besides the case of using an algorithm using the integrated value of the signal component of each area. The method using the external sensor is ordinary. This method is especially effective when the linearity of each color component cannot be kept owing to the generation of color mixture in each color component of R, G and B, the existence of the difference of accumulation capacitance, the jumping of barriers of a semiconductor, and the like in case of using an image pickup element having an image pickup area provided with arrangement of a plurality of pixels each including a plurality of photodiodes in the depth direction of a semiconductor, for example, an image pickup element having a three-photodiode structure or the like.

Figure 4:
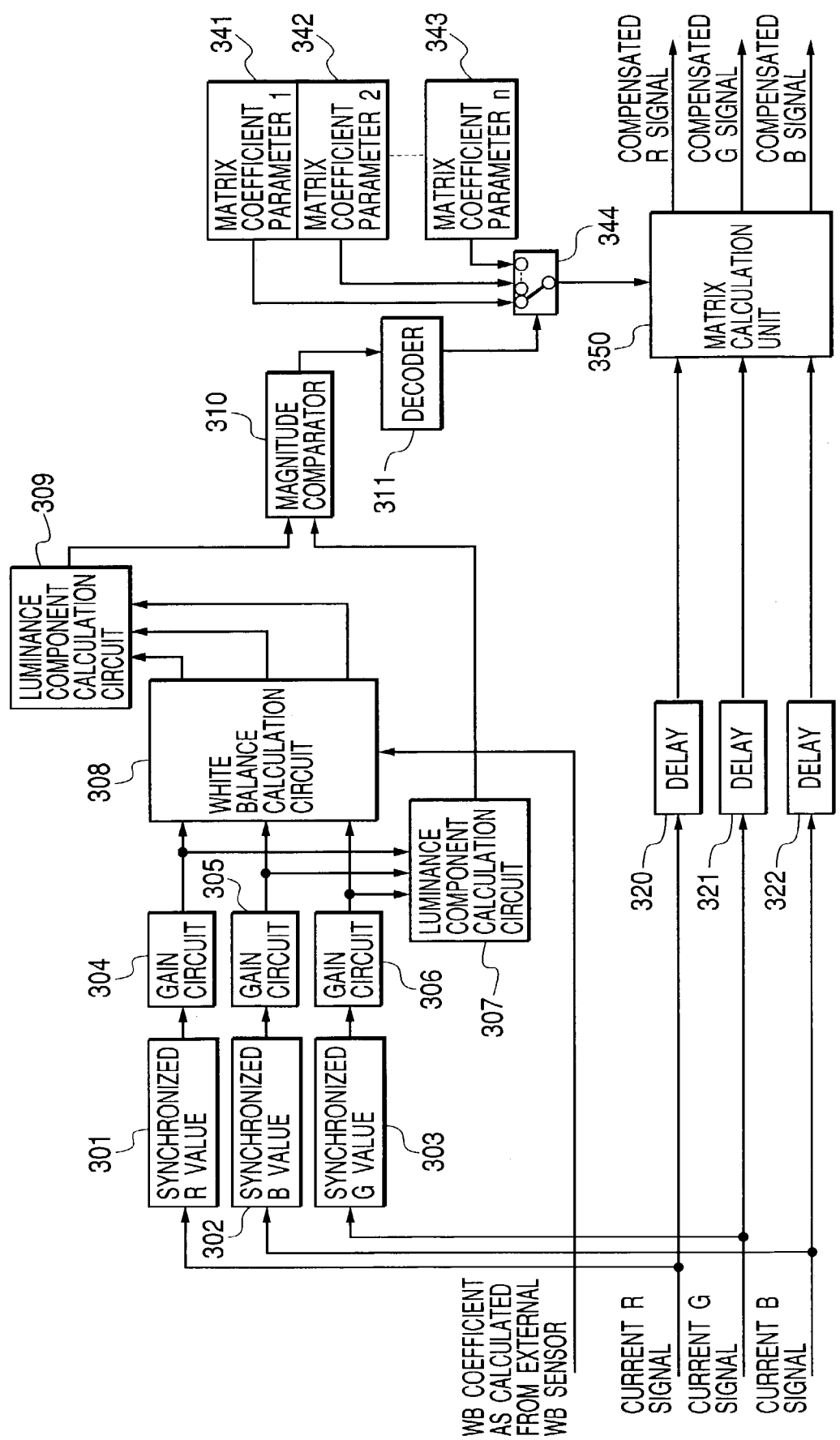
FIG. 4 is a block diagram showing an image pickup apparatus of a third embodiment.

FIG. 4 shows a method for compensating the linearity of each color signal of the image pickup element having the three-photodiode structure by means of the external color temperature sensor (not shown).

Input R, G and B signal components are synchronized by synchronization circuits 301, 302 and 303 in FIG. 4, respectively, and are multiplied by appropriate gains in gain circuits 304, 306 and 305, respectively, in order not to saturate after calculations.

Then, the synchronized and gain-adjusted R, G and B signal components are input into a luminance component calculation circuit 307. The signal components are also input into a white balance calculation circuit 308, to which coefficients are given from the external sensor. The white balance calculation circuit 308 is set to make a calculation result of a white detection position is white by multiplying the R, G and B signal components by each of the white balance coefficient values calculated by the CPU 116 or the like on the basis of the information from the external sensor.

However, each color signal component from the image pickup element having the three-layer photodiode structure to be used in the present embodiment causes deviations of colors in a resulted image owing to the influence of the color mixture and the capacitance disagreements, and the noises of the jumping of the barriers in case of using the coefficients set in the white balance calculation circuit 308. Accordingly, the present embodiment inputs the calculated coefficients obtained from the external sensor into another luminance component calculation circuit 309 to generate a luminance component subjected to the adjustment by the external color temperature sensor. Then, the present embodiment obtains with a magnitude comparator 310 the difference of the luminance calculation results provided respectively before and after the white balance calculation circuit 308.

Although the present embodiment calculates the luminance component with the luminance component calculation circuits 307 and 309 to compare the difference between them, it is needless to say that R, G and B signals provided respectively before and after the white balance calculation circuit 308 may be compared on each color basis. The present embodiment calculates the luminance component because of simplification of the configuration portion.

Using the outputs of the magnitude comparator 310, changes of the color space can be obtained in the pre-study of the image processing. The obtained values of the changes are written into a table to be reflected to the values to be selected by a decoder 311 in FIG. 4. It is needless to say that compensation values for the color adjustment may be calculated in the processes of the processing in the image pickup apparatus. However, in that case, the control and the configuration for realizing the calculation of the compensation values become very complicated so that, for example, the output of a matrix calculation unit 350 is fed back as an adjusting input in order that the outputs of the magnitude comparator 310 satisfy a certain difference condition. From the point of view of simplification, the present embodiment does not adopt the feedback, but adopts the processing of the decoder 311 and deals with matrix coefficient parameters (represented by reference numerals 341–343) as a table.

The decoder 311 outputs an instruction in accordance with the outputs of the magnitude comparator 310 so as to make a switch 344 switch the matrix coefficient parameters 341–343 appropriately. The matrix coefficient parameter having passed through the switch 344 is transmitted to the matrix calculation unit 350 to be used as the correction coefficient to the R, G and B signal components which are delayed by delay units 320–322 respectively to be synchronized with the switching timing of the switch 344.

As described above, the image pickup apparatus of the present embodiment includes the image pickup area provided with arrangement of plurality of pixels each including a plurality of photoelectric conversion portions in the depth direction of a semiconductor, the matrix coefficient parameters 341–343 which are plurality of color correction coefficients, the matrix calculation unit 350 which is color correction means for performing the color corrections of the signal from the image pickup area using the plurality of color correction coefficients, the color temperature sensor for detecting color temperatures, and a coefficient discrimination means including the synchronization circuits 301–303, the gain circuits 304–306, the luminance compensation calculation circuits 307 and 309, the white balance calculation circuit 308, the magnitude comparator 310, the decoder 311 and the switch 344. The coefficient discrimination means is arranged to discriminate the color correction coefficients to be used for color correction in the color correction means, on the basis of the signal from the image pickup area and the signal from the color temperature sensor. According to the configuration mentioned above, it becomes possible to perform appropriate color correction when the linearity of each of the color components of R, G and B cannot be kept owing to the generation of color mixture in each of the color components, the existence of storage capacitance differences, the jumping of the barriers of a semiconductor, and the like in case of using the image pickup element having the image pickup area provided with the arrangement of the plurality of pixels each including the plurality of photodiodes in the depth direction of the semiconductor, such as the image pickup element having the three-layer photodiode structure.

Though the embodiment described above is configured to discriminate the tables of the matrix coefficient parameters (color correction parameters) by switching them with the switch 344, the values of the matrix coefficient parameters may be determined by the calculation processing using, for example, a sequential algorithm instead of using the table.

In the present embodiment, although descriptions are given to the case using the image pickup area provided with arrangement of the pixels each including three-layer photoelectric conversion portions in the depth direction of the semiconductor, each of the pixels may have a structure of, for example, four layers which absorb the wavelengths of cyan, magenta, yellow and black (CMYK), respectively.

In the above, though the matrix coefficients, which are an example of color correction coefficients, are disclosed, it may adopted that white balance coefficients, another example of the color correction coefficients, are made to be different for every pixel or every area to perform white balance processing, which is one of color correction processings, by using the different white balance coefficients.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
an image pickup area provided with an arrangement of a plurality of pixels, each including a plurality of photoelectric conversion portions in a depth direction of a semiconductor; and
a signal processing device which divides said image pickup area into a plurality of partial areas and performs color correction on signals from at least two areas among said plurality of partial areas by using different color correction coefficients,
wherein the partial areas are divided on a basis of a state of color mixture at a pixel position in said image pickup area.

2. An image pickup apparatus according to claim 1, wherein said signal processing device has a mode for discriminating the color correction coefficients to be used for the color correction on a basis of the signal from said image pickup area, and a mode for performing the color correction of the signal from said image pickup area by using the color correction coefficients.

3. An image pickup apparatus according to claim 1, further comprising a storage device which stores information pertaining to the plurality of pixels in said image pickup area,
wherein said signal processing device has a mode for discriminating the color correction coefficients to be used for the color correction on a basis of the information stored in said storage device and a mode for performing the color correction of the signal from said image pickup area by using the color correction coefficients.

4. An image pickup apparatus according to claim 3, wherein the information stored in said storage device, pertaining to the plurality of pixels in said image pickup area, includes information based on a state of color mixture at a pixel position in said image pickup area.

5. An image pickup apparatus according to claim 1, wherein said signal processing device performs a matrix operation as the color correction.

6. An image pickup apparatus according to claim 5, wherein the matrix operation includes mapping of coordinates on a same color space.

7. A signal processing method of an image pickup apparatus including an image pickup area provided with arrangement of pixels, each including a plurality of photoelectric conversion portions in a depth direction of a semiconductor, said method comprising:

dividing said image pickup area into a plurality of partial areas; and performing color correction on signals from at least two areas among said plurality of partial areas using different color correction coefficients, wherein the partial areas are divided on a basis of a state of color mixture at a pixel position in the image pickup area.

8. A signal processing method according to claim 7, further comprising:

discriminating the color correction coefficients to be used for the color correction on a basis of the signal from said image pickup area, wherein said method performs the color correction of the signal from said image pickup area by using the different color correction coefficients of the plurality of partial areas, respectively.

9. A signal processing method according to claim 7, further comprising:

storing information pertaining to the plurality of pixels in the image pickup area into a storage device, and discriminating the color correction coefficients to be used for the color correction on a basis of the information stored in the storage device, wherein said method performs the color correction of the signal from said image pickup area by using the discriminated color correction coefficients to the plurality of partial areas, respectively.

10. A signal processing method according to claim 9, wherein the information stored in the storage device, pertaining to the plurality of pixels in the image pickup area, includes information based on a state of color mixture at a pixel position in the image pickup area.

11. A signal processing method according to claim 7, wherein the color correction includes a matrix operation.

12. A signal processing method according to claim 11, wherein the matrix operation includes mapping of coordinates on a same color space.

* * * * *